US008303136B2

(12) United States Patent
Lai et al.

(10) Patent No.: US 8,303,136 B2

(45) Date of Patent: Nov. 6, 2012

(54) LED ILLUMINATION DEVICE

(75) Inventors: Chih-Ming Lai, Miao-Li Hsien (TW); Yu-Pin Liu, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 135 days.

(21) Appl. No.: 12/846,858

(22) Filed: Jul. 30, 2010

(65) Prior Publication Data

US 2011/0075417 A1 Mar. 31, 2011

(30) Foreign Application Priority Data

Sep. 29, 2009 (CN) .......................... 2009 1 0307892

(51) Int. Cl.

*F21V 29/00* (2006.01)
*F21V 5/00* (2006.01)
*B60Q 1/06* (2006.01)
*G02B 21/26* (2006.01)

(52) U.S. Cl. ......................... 362/294; 362/373; 362/580

(58) Field of Classification Search .................. 362/294, 362/373, 580

See application file for complete search history.

(56) References Cited

U.S. PATENT DOCUMENTS

| | | | | |
|---|---|---|---|---|
| 7,575,346 | B1 * | 8/2009 | Horng et al. | 362/373 |
| 7,832,891 | B2 * | 11/2010 | Zhou | 362/192 |
| 8,057,071 | B2 * | 11/2011 | He et al. | 362/294 |
| 8,115,395 | B2 * | 2/2012 | Horng et al. | 315/117 |
| 2004/0261975 | A1 | 12/2004 | Kozyra et al. | |
| 2009/0046473 | A1 * | 2/2009 | Tsai et al. | 362/373 |
| 2010/0181889 | A1 * | 7/2010 | Falicoff et al. | 313/46 |
| 2010/0289395 | A1 * | 11/2010 | Sun et al. | 313/45 |
| 2011/0051414 | A1 * | 3/2011 | Bailey et al. | 362/235 |
| 2011/0074267 | A1 * | 3/2011 | Tsao et al. | 313/46 |
| 2011/0254421 | A1 * | 10/2011 | Thomas | 313/46 |
| 2011/0298350 | A1 * | 12/2011 | van de Ven | 313/46 |
| 2012/0019145 | A1 * | 1/2012 | Lai | 315/114 |

FOREIGN PATENT DOCUMENTS

| | | | |
|---|---|---|---|
| CN | 2921565 | Y | 7/2007 |
| CN | 101089461 | A | 12/2007 |

* cited by examiner

*Primary Examiner* — Jong-Suk (James) Lee

*Assistant Examiner* — David J Makiya

(74) *Attorney, Agent, or Firm* — Altis Law Group, Inc.

(57) ABSTRACT

An LED illumination device comprises a base, at least one LED light source and a heat dissipation module. The base has a first surface and a second surface opposite to the first surface. The LED light source is located on the second surface of the base. The heat dissipation module is thermally connected to the first surface of the base. The heat dissipation module has a staff and a spiral heat sink, which is attached to the staff. The staff is mounted on the base and the spiral heat sink is mounted on the staff. The spiral heat sink generates airflow through the LED light source when the spiral heat sink and the staff are rotated relative to the base, whereby heat dissipation efficiency of the LED light source is optimized accordingly.

9 Claims, 5 Drawing Sheets

LED ILLUMINATION DEVICE

BACKGROUND

1. Technical Field

The present disclose is related to illumination devices, and particularly to a light emitting diode (LED) illumination device.

2. Description of Related Art

Effective heat dissipation is a major challenge in LED technology. The lifespan of an LED is shortened if the heat generated by the LED can not be dissipated efficiently.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Figure 1:
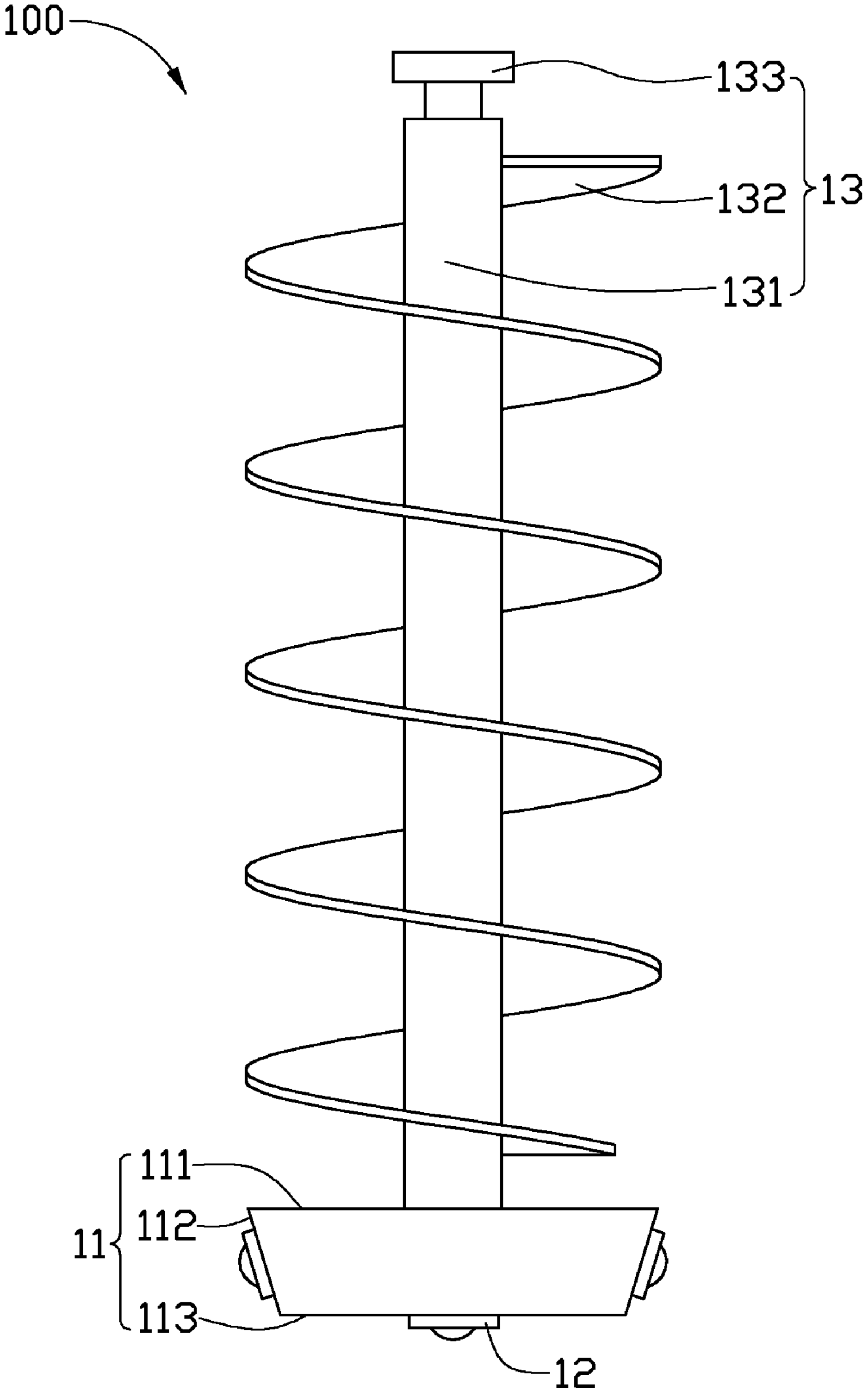
FIG. 1 is a schematic diagram of a first embodiment of an LED illumination device.

FIG. 1 is a schematic diagram of a first embodiment of an LED illumination device 100, including a base 11, at least one LED light source 12, and a heat dissipation module 13.

The base 11 is material with good heat dissipation ability, such as aluminum, copper, tin, gold, wolfram, molybdenum or alloys thereof. In addition, the material of the base 11 can be ceramic, polycrystalline silicon or polycrystalline germanium. Moreover, the base 11 may be a multi layer printed circuit board (PCB) with metal core. In the embodiment, the base 11 manufactured by copper includes a first surface 111, a second surface 112 and a third surface 113. The second surface is opposite to the first surface 111 and the third surface 113 is located between the first surface 111 and the second surface 112. The area of the first surface 111 exceeds that of the second surface 112. The overall shape of the base 11 is a frustum of a cone or of a pyramid.

The LED light source 12 is located on the second surface 112 and the third surface 113. The heat generated by the LED light source 12 can be conducted to the base 11.

The heat dissipation module 13 located opposite to the LED light source 12 is disposed on the first surface 111 of the base 11. The heat generated by the LED light source 12 is conducted to the heat dissipation module 13 through the base 11 and evacuated to the exterior by the heat dissipation module 13.

The heat dissipation module 13 includes a staff 131 and a spiral heat sink 132, attached to and extending along the staff 131. The staff 131 and the heat sink 132 are made of aluminum, copper, tin, gold, wolfram, molybdenum or alloys thereof. One end of the staff 131 is attached to the first surface 111 and another extends away from the LED light source 12. In the embodiment, the axis of the staff 131 is the same as that of the base 11. The staff 131 and the base 11 are formed separately and then assembled together. The staff 131 is rotatably attached to the base 11.

The spiral heat sink 132 conducts airflow therealong to enhance ventilation of heated air, whereby heat dissipation efficiency is maximised.

The heat dissipation module 13 further includes a driving module 133 located on the end of the staff 131 away from the base 11. The driving module 133 rotates the staff 131 and the heat sink 132 to further enhance ventilation of heated air, whereby heat dissipation efficiency is maximised.

Figure 2:
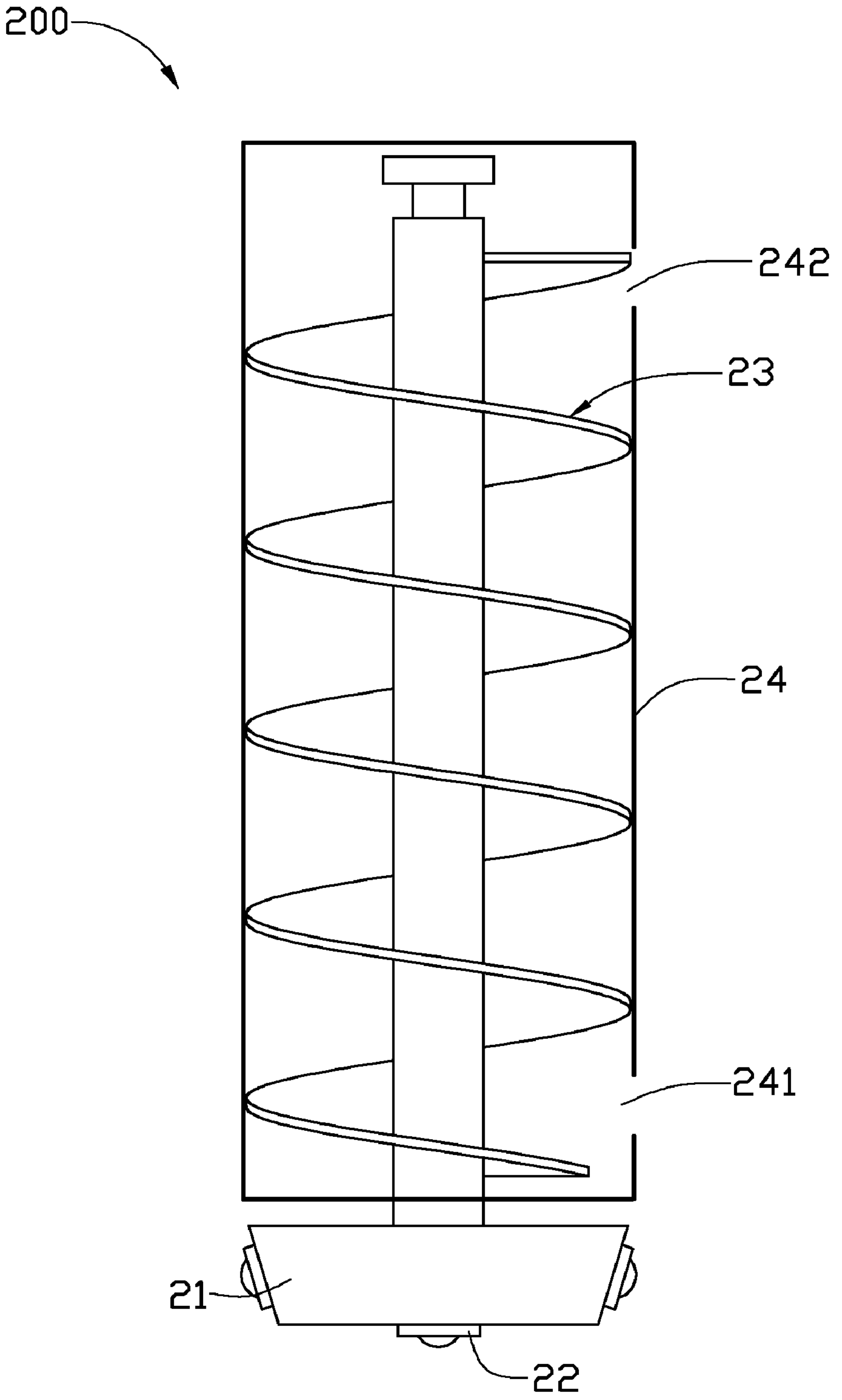
FIG. 2 is a schematic diagram of a second embodiment of an LED illumination device.

FIG. 2 is a schematic diagram of a second embodiment of an LED illumination device 200, differing from the first embodiment only in the addition of a shell 24 housing the heat dissipation module 23. The internal diameter of the shell 24 corresponds to the external diameter of the heat dissipation module 23, enabling attachment thereto.

An air inlet 241 at the end of the shell 24 near the LED light source 22 supplies air to the shell 24 from outside. An air outlet 242 is located at the end of the shell 24 away from the LED light source 22 for discharging hot air to the exterior from the interior of the shell 24.

Figure 3:
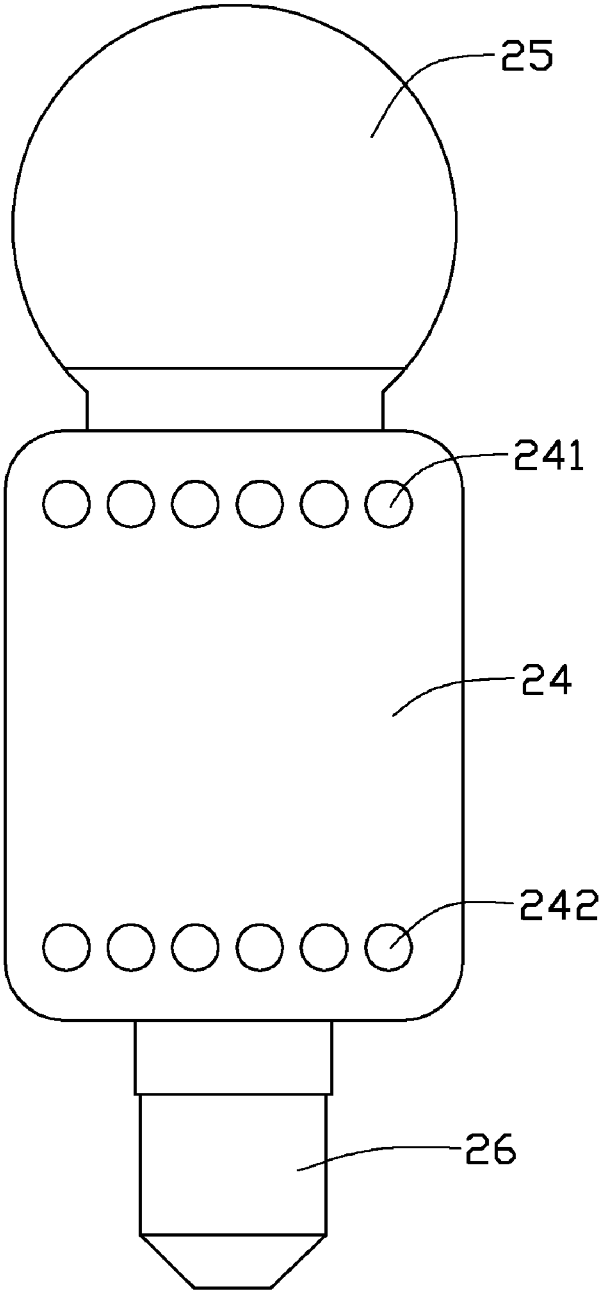
FIG. 3 is a schematic diagram of a third embodiment of an LED illumination device.

FIG. 3 is a schematic diagram of a third embodiment of an LED illumination device, differing from the previous embodiment only in the addition of a light shade 25 and a plug 26. The light shade 25 covers the LED light source 22. The light generated by the LED light source 22 is emitted to the exterior through the light shade 25. The plug 26 is located on one side of the heat dissipation module 23 away from the base 21 for connection to a power supply.

In the embodiment, a plurality of inlets 241 and outlets 242 is arranged around the shell 24. The multiple inlets 241 and outlets 242 improve the air-exchange rate so as to enhance heat dissipation efficiency.

Figure 4:
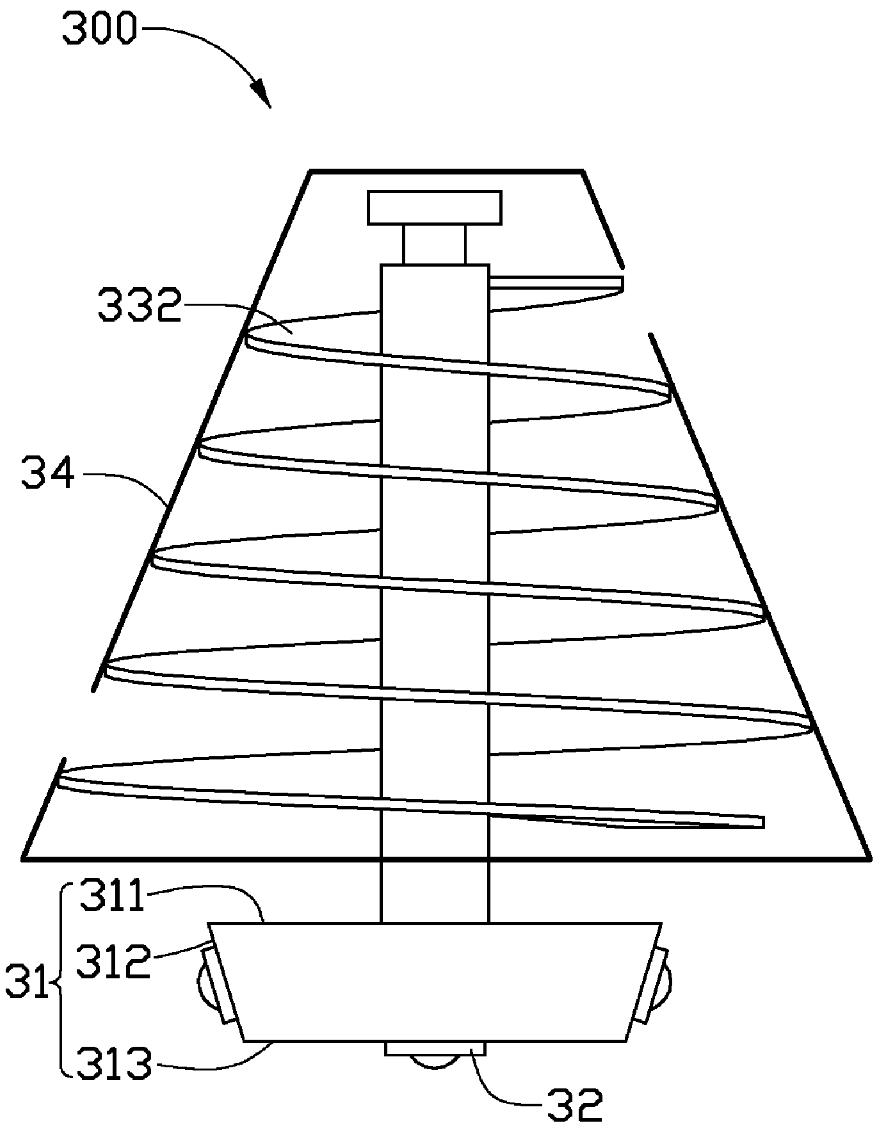
FIG. 4 is a schematic diagram of a fourth embodiment of an LED illumination device.

FIG. 4 is a schematic diagram of a fourth embodiment of an LED illumination device 300, differing from the previous embodiment only in that the external diameter of the spiral heat sink 332 decreases with distance from the LED light source 32. The shell 34 has a diameter matching the diameter of the spiral heat sink 332, gradually decreasing with distance from the LED light source 32.

Figure 5:
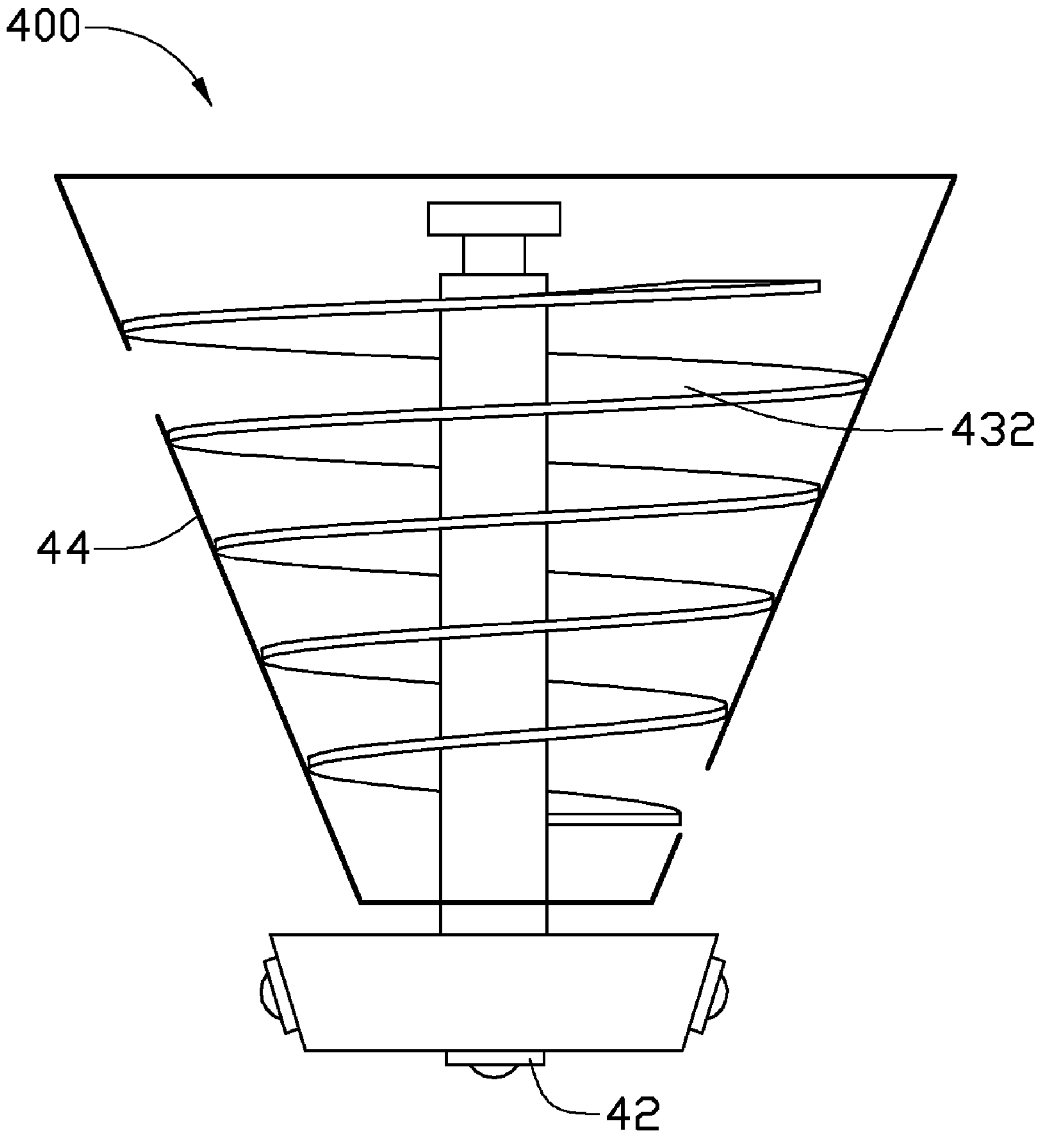
FIG. 5 is a schematic diagram of a fifth embodiment of an LED illumination device.

FIG. 5 is a schematic diagram of a fifth embodiment of an LED illumination device 400, differing from the previous embodiment only in that the external diameter of the spiral heat sink 432 increases with distance from the LED light source 42. The shell 44 has a diameter matching the diameter of the spiral heat sink 432, gradually increasing with distance from the LED light source 42.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. An LED illumination device, comprising:

a base comprising a first surface and a second surface opposite to the first surface;

at least one LED light source on the second surface of the base; and a heat dissipation module thermally connected to the first surface of the base comprising a staff and a spiral heat sink attached to the staff, the staff is mounted on the base, and the spiral heat sink being in a form of a singale spiral blade surrounding the staff for at least one turn and extending along a length of the staff.

2. The LED illumination device of claim 1, further comprising a driving module on one end of the staff for rotating the spiral heat sink and the staff.

3. The LED illumination device of claim 1, wherein an external diameter of the spiral heat sink decreases with distance from the at least one LED light source.

4. The LED illumination device of claim 1, wherein an external diameter of the spiral heat sink increases with distance from the at least one LED light source.

5. The LED illumination device of claim 1 further comprising a shell enclosing the spiral heat sink and comprising at least one air inlet and at least one air outlet, the air inlet near the at least one LED light source and the air outlet away from the at least one LED light source.

6. The LED illumination device of claim 5, wherein the at least one air inlet includes multiple air inlets arranged around the shell.

7. The LED illumination device of claim 5, wherein the at least one air outlet includes multiple air outlets arranged around the shell.

8. The LED illumination device of claim 5, further comprising a light shade covering the at least one LED light source, to which light is emitted from the at least one LED light source.

9. The LED illumination device of claim 5, further comprising a plug located on one side of the heat dissipation module away from the base and configured for connecting a power source.

* * * * *